United States Patent
Whitmyer, Jr.

(10) Patent No.: US 10,387,978 B2
(45) Date of Patent: Aug. 20, 2019

(54) SYSTEM AUTOMATING THE PREPARATION OF INTERNATIONAL INTELLECTUAL PROPERTY APPLICATIONS FOR FILING

(71) Applicant: Whitmyer IP Group LLC, Stamford, CT (US)

(72) Inventor: Wesley W. Whitmyer, Jr., Stamford, CT (US)

(73) Assignee: Whitmyer IP Group LLC, Stamford, CT (US)

( * ) Notice: Subject to any disclaimer, the term of this patent is extended or adjusted under 35 U.S.C. 154(b) by 340 days.

(21) Appl. No.: 15/223,692

(22) Filed: Jul. 29, 2016

(65) Prior Publication Data

US 2017/0032482 A1 Feb. 2, 2017

Related U.S. Application Data

(60) Provisional application No. 62/198,993, filed on Jul. 30, 2015.

(51) Int. Cl.
*G06Q 50/18* (2012.01)
*G06Q 10/06* (2012.01)
(Continued)

(52) U.S. Cl.
CPC ........... *G06Q 50/184* (2013.01); *G06Q 10/06* (2013.01); *G06Q 30/04* (2013.01); *H04L 63/08* (2013.01); *H04L 2463/103* (2013.01)

(58) Field of Classification Search
CPC .............................. G06Q 50/184; G06Q 50/18
(Continued)

(56) References Cited

U.S. PATENT DOCUMENTS 8,539,004 B2 * 9/2013 Foygel .................. G06Q 50/18
707/608
9,183,278 B2 * 11/2015 Pogodin ................ G06Q 10/10
(Continued)

OTHER PUBLICATIONS

Perfectlaw: All-In-One Software, AIM: Attorney's Information Manager http://www.perfectlaw.com/SalesLiterature/FrontOffice/AIM.pdf Date Site Accessed: Oct. 31, 2016 2 Pages.
(Continued)

*Primary Examiner* — Andrew Joseph Rudy
(74) *Attorney, Agent, or Firm* — Whitmeyer IP Group LLC

(57) ABSTRACT

A system for automating preparation of IP applications has a server, a priority computer associated with a priority professional and a priority jurisdiction, and a second computer associated with a second professional and a second jurisdiction. A data store has portions associated with each professional, and which are only accessible by the respective professional after authentication. The priority professional sends application data for an IP application to the server for storage in the data store. The priority professional sends an instruction to initiate filing of the IP application in the second jurisdiction. A replicator on the server copies the application data to the portion of the data store associated with the second professional. A document assembler on the server assembles filing documents for the second jurisdiction by combining the application data with at least one form. The server sends the filing documents to the second professional for review and filing.

31 Claims, 4 Drawing Sheets

(51) Int. Cl.
*H04L 29/06* (2006.01)
*G06Q 30/04* (2012.01)

(58) Field of Classification Search
USPC .............................................. 705/32–34, 310
See application file for complete search history.

(56) References Cited

U.S. PATENT DOCUMENTS

| | | | | |
|---|---|---|---|---|
| 9,438,604 | B1* | 9/2016 | Addala | H04L 9/3226 |
| 9,710,457 | B2* | 7/2017 | Stobbs | G06F 17/2785 |
| 2002/0065676 | A1* | 5/2002 | Grainger | G06Q 10/10 |
| | | | | 705/310 |
| 2005/0038683 | A1* | 2/2005 | Leem | G06Q 10/10 |
| | | | | 705/310 |
| 2007/0016431 | A1* | 1/2007 | Desai | G06Q 50/184 |
| | | | | 705/310 |
| 2009/0307004 | A1* | 12/2009 | Quinn, Jr. | G06Q 10/10 |
| | | | | 705/310 |
| 2013/0218785 | A1* | 8/2013 | Marusyk | G06Q 50/184 |
| | | | | 705/310 |
| 2013/0218786 | A1* | 8/2013 | Lee | G06Q 10/06 |
| | | | | 705/310 |
| 2013/0317994 | A1* | 11/2013 | Tran | G06Q 50/184 |
| | | | | 705/310 |
| 2014/0041017 | A1* | 2/2014 | Wentworth | G06F 21/31 |
| | | | | 726/17 |
| 2015/0019448 | A1* | 1/2015 | Lee | G06Q 10/06 |
| | | | | 705/310 |
| 2017/0097747 | A1* | 4/2017 | Allen | G06F 3/0482 |
| 2017/0098290 | A1* | 4/2017 | Allen | G06Q 50/184 |

OTHER PUBLICATIONS

Perfectlaw, All-In-One Software: Document Assembly http://www.perfectlaw.com/SalesLiterature/FrontOffice/DocumentAssembly.pdf Date Site Accessed: Oct. 31, 2016 2 Pages.

Perfectlaw All-In-One Software: Patent & Trademark Glossary of Products http://www.perfectlaw.com/SalesLiterature/FrontOffice/1-2009PatentTrademarkGlossary.pdf Date Site Accessed: Oct. 31, 2016 35 Pages.

* cited by examiner

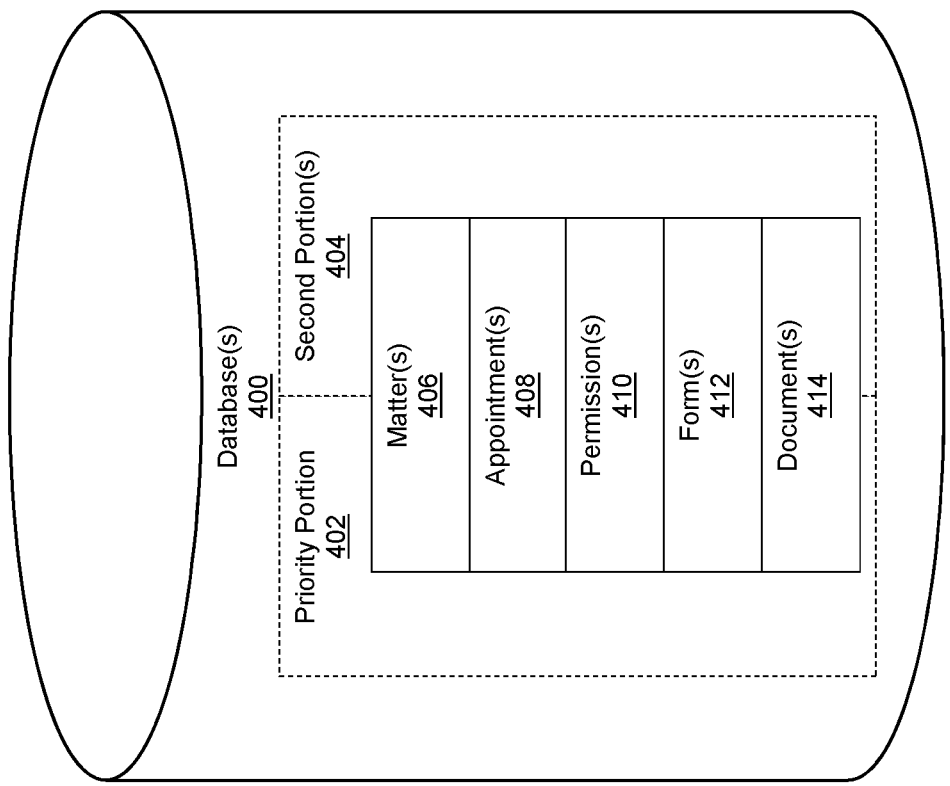

SYSTEM AUTOMATING THE PREPARATION OF INTERNATIONAL INTELLECTUAL PROPERTY APPLICATIONS FOR FILING

CROSS-REFERENCE TO RELATED APPLICATIONS

This patent application claims the benefit, under 35 U.S.C. § 119(e), of U.S. Provisional Patent Application Ser. No. 62/198,993, filed on Jul. 30, 2015, the content of which is incorporated herein by reference in its entirety.

FIELD OF THE INVENTION

The present teachings relate generally to the preparation and filing of intellectual property ("IP") applications and related papers between jurisdictions, and more particularly to an automated network-based system that replicates IP application information.

BACKGROUND OF THE INVENTION

Typically, an IP application is filed in a first jurisdiction (e.g., priority jurisdiction) and subsequently filed in second jurisdiction such that the application in the second jurisdiction claims priority to the priority jurisdiction. A professional in the priority jurisdiction (e.g., priority professional) prepares the IP application on his or her own computer and then transmits it over the Internet by email (or other telecommunication network) to a second professional for preparation and filing in the second jurisdiction.

In order for the second professional to file the application in the second jurisdiction, he or she is required to maintain a computer system (e.g., second computer system) and local area network to receive the IP application, as well as staff to prepare the application and related documents for filing. The second professional (or a staff member, etc.) re-enters the bibliographic information and received application data into the second computer system to prepare documents necessary to file the application in the second jurisdiction.

The current system has many disadvantages for the priority professional. For example, transmission of the application to the second professional is not secure unless both professionals have previously established end to end transmission security in advance. Establishing this security places technical burdens on both professionals—even assuming both sides use similar computing environments—that are generally outside the scope of their business focus of preparing IP applications.

Another concern for the priority professional is the security of the IP application while stored on the second professional's computer system. The priority professional has no knowledge or control over whether application documents are encrypted, backed up, or handled securely by the second professional.

Yet another concern for priority professional is the re-entry of bibliographical and application data by the second professional. The priority professional has no knowledge or control of whether any steps are taken to avoid errors. Perhaps more importantly, the re-entry of data into the second professional's computer system, as well as into documents for filing, creates unnecessary expense. This additional expense can be significant, especially when the priority professional seeks to file in multiple jurisdictions. In addition, in the event the information must be translated the priority professional has no knowledge or control of who is performing the translation or if any steps are being taken to avoid errors.

Ordinarily, IP professionals exchange IP applications for filing in each other's jurisdictions. In jurisdictions where the market is small or there are otherwise relatively few incoming international IP application filings, the cost to file outside the jurisdiction becomes more critical. Employing staff is often the highest cost facing an IP professional, so any system that reduces staff requirements generally lowers cost and therefore is likely to increase the volume of new filings from outside the jurisdiction.

The concerns of the priority professional are imposed on the second professional who needs staff not only to maintain the necessary computing resources to satisfy the requirements of the priority professional as well as possible governmental privacy mandates, but also for re-entering bibliographical and application information, and for drafting or receiving and revising the IP application (e.g., which may be a data file). In addition, at least a portion of the second jurisdiction professionals' staff may have to be bilingual and have multilingual computing resources in order to establish secure computing links and/or minimize data file translation and bibliographic information re-entering errors.

It is known, as described above, for intellectual property professionals to exchange, usually over the Internet, intellectual property applications for filing in other jurisdictions. It is also known to use network-based document management software, such as that provided by PerfectLaw® and identified in the information disclosure statement submitted with this application, the content of which is incorporated by reference in its entirety. What is not known, however, is use by intellectual property professionals in different jurisdictions of the same network-based system with access to different portions of a database to streamline filing of IP applications in multiple jurisdictions without the problems and costs known in the prior art. Therefore, it would be beneficial to have an alternative system and method for automating the preparation of international intellectual property applications for filing.

SUMMARY OF THE INVENTION

The needs set forth herein as well as further and other needs and advantages are addressed by the present teachings, which illustrate solutions and advantages described below.

What is desired is a cloud-based system for at least partially automating the preparation and filing of IP applications between jurisdictions, and more particularly to a system and method which replicates application information from one of a plurality of matter files accessible by a priority professional in a priority jurisdiction to a matter file accessible by a second professional in a second jurisdiction. This reduces manual entry of bibliographic information, transmission, receipt and manipulating of data files for the IP application, improves the security and reliability of transmitting the application, and increases the ability to automate the assembly of documents necessary for filing the application in one or more second jurisdictions with reduced errors and cost.

The system according to the present teachings may include, although not limited thereto, a server, a priority computer associated with a priority professional and a priority jurisdiction, and a first secure connection over the Internet between the server and the priority computer, the first secure connection requiring authentication of the priority professional. It may further include a plurality of second professionals, a plurality of second computers, each associated with one of the plurality of second professionals, a plurality of second jurisdictions, each associated with one of the plurality of second professionals, and a plurality of second secure connections over the Internet, one between each second computer and the server, each second secure connection requiring authentication of the associated second professional. A data store may be accessible by the server, the data store having a matter database, each matter having a matter number, a forms database, each form relating to an intellectual property filing document, and an appointment database, each appointment relating to a filing deadline. The priority professional may be associated with a first portion of the data store, and each second professional may be associated with a second portion of the data store. Each of the first and second portions of the data store may only be accessible by the associated professional after authentication and not accessible by any of the other professionals. An interface on the priority computer may receive from the priority professional application data for an IP application, and send the application data to the server over the first secure connection. An interface on the server may receive the application data from the priority computer, and store the application data in the first portion of the data store. The interface on the priority computer may receive from the priority professional an instruction to initiate filing of the IP application in each second jurisdiction, and send the instruction to the server over the first secure connection. A replicator on the server may be adapted to copy the application data from the first portion of the data store to each second portion of the data store. A new matter record may be created by the replicator and stored in each second portion of the data store, the replicator creating each new record by copying matter information from a priority matter stored in the first portion of the data store, the priority matter having matter information for the IP application. A new appointment record may be created by the replicator and stored in each second portion of the data store, each new appointment record relating to the filing deadline for the IP application in the associated second jurisdiction. A document assembler on the server may be adapted to assemble documents for the IP application. A specification document may be created by the document assembler for each second jurisdiction, the specification document for each second jurisdiction assembled by combining the application data with a form retrieved from the second portion of the data store associated with the respective second professional. An application information sheet may be created by the document assembler for each second jurisdiction, the application information sheet for each second jurisdiction assembled by combining the application data with a form retrieved from the second portion of the data store associated with the respective second professional. The interface on the server may send the specification document and application information sheet for each second jurisdiction to the associated second computer over its second secure connection for review and filing by the associated second professional.

A translator on the server may translate at least a portion of the application data into a different language for each second jurisdiction.

The system may limit each second jurisdiction to a single second professional.

The application data copied by the replicator may have a temporary state that only lasts until the specification and application information sheet are assembled.

The replicator may only copy the application data at the time the filing documents are assembled.

The specification document may comprise a specification for a new patent application and the application information sheet may comprise an application data sheet.

The specification document may comprise a new trademark application and the application information sheet may comprise a cover sheet for the new trademark application.

A billing module on the server may automatically create an invoice for each second professional to file the IP application, and transmit each invoice to the priority professional.

The server may transmit filing documents for each second jurisdiction to an official government office for filing in the respective second jurisdiction.

Each new matter record may be associated with a matter number for the priority matter.

The server may comprise a plurality of computers communicating with each other over a network.

The system according to the present teachings may include, although not limited thereto, a server, a priority computer associated with a priority professional and a priority jurisdiction, and a first secure connection over the Internet between the server and the priority computer, the first secure connection requiring authentication of the priority professional. The system may further include at least one second professional, at least one second computer, each associated with one of the at least one second professional, at least one second jurisdiction, each associated with one of the at least one second professional, and at least one second secure connection over the Internet between the server and each at least one second computer, each second secure connection requiring authentication of the associated second professional. A data store may be accessible by the server. The priority professional may be associated with a first portion of the data store, and each second professional may be associated with a second portion of the data store. Each of the first and second portions of the data store may only be accessible by the associated professional after authentication and not accessible by any of the other professionals. An interface on the priority computer may receive from the priority professional application data for an IP application, and send the application data to the server over the first secure connection. An interface on the server may receive the application data from the priority computer, and store the application data in the first portion of the data store. The interface on the priority computer may receive from the priority professional an instruction to initiate filing of the IP application in each second jurisdiction, and send the instruction to the server over the first secure connection. A document assembler on the server may assemble filing documents for each second jurisdiction, the filing documents for each second jurisdiction assembled by combining the application data with at least one form retrieved from the associated second portion of the data store. The interface on the server may send the filing documents for each second jurisdiction to the associated second computer over its second secure connection for review and filing by the associated second professional.

The data store may comprise a plurality of matter records, each matter record having a matter number, bibliographic information, and priority data. A priority matter record of the plurality of matter records may be stored in the first portion of the data store, the priority matter record having matter information for the IP application. A replicator on the server may create a new matter record in each second portion of the data store, the replicator creating each new record by copying the matter information from the priority matter record.

The filing documents may comprise at least two of: a specification, a drawing, an information disclosure statement, a power of attorney, a declaration, and an assignment.

The data store may comprise a plurality of appointment records. A new appointment record may be created in each second portion of the data store, each new appointment record relating to the filing deadline for the IP application in the associated second jurisdiction.

There may only be a single persistent copy of the application data on the server regardless of the number of second jurisdictions.

The document assembler may automatically create the filing documents, the interface on the server providing the filing documents to the priority professional for review and approval before sending to the second computers.

The interface on the priority computer may comprise a webpage provided by the server.

The system according to the present teachings may include, although not limited thereto, a server, a priority computer associated with a priority professional and a priority jurisdiction, and a first secure connection over the Internet between the server and the priority computer, the first secure connection requiring authentication of the priority professional. The system may also include at least one second professional, at least one second computer, each associated with one of the at least one second professional, and at least one second jurisdiction, each associated with one of the at least one second professional. A data store may be accessible by the server. An interface on the priority computer may receive from the priority professional application data for an IP application, and send the application data to the server over the first secure connection. An interface on the server may receive the application data from the priority computer, and store the application data in the data store. The interface on the priority computer may receive from the priority professional an instruction to initiate filing of the IP application in each second jurisdiction, and send the instruction to the server over the first secure connection. A document assembler on the server may assemble filing documents for each second jurisdiction, the filing documents for each second jurisdiction assembled by combining the application data with at least one form retrieved from the data store. The interface on the server may send the filing documents for each second jurisdiction to the associated second computer for review and filing by the associated second professional.

The at least one second professional may comprise a plurality of second professionals, the document assembler may automatically create the filing documents, and a translator on the server may translate at least a portion of the application data into a different language for each second jurisdiction.

The system according to the present teachings may include, although not limited thereto, a server, a priority computer associated with a priority professional and a priority jurisdiction, and a first secure connection over the Internet between the server and the priority computer, the first secure connection requiring authentication of the priority professional. A data store may be accessible by the server. An interface on the priority computer may receive from the priority professional application data for an IP application, and send the application data to the server over the first secure connection. An interface on the server may receive the application data from the priority computer, and store the application data in the data store. The interface on the priority computer may receive from the priority professional an instruction to initiate filing of the IP application in at least one second jurisdiction, and send the instruction to the server over the first secure connection. A selector module on the server may select at least one second professional, each at least one second professional associated with one of the at least one second jurisdiction. A permissions module on the server may change the permissions for the application data stored in the data store to allow access by the at least one second professional. A document assembler on the server may assemble filing documents for the at least one second jurisdiction, the filing documents assembled by combining the application data with at least one form retrieved from the data store. The interface on the server may send the filing documents for the at least one second jurisdiction to each associated second computer for review and filing by the associated second professional.

The selection module may use preferences of the priority professional stored in the data store, the preferences including the identification of at least one preferred second professional for a particular second jurisdiction.

A social module on the server may maintain ratings of second professionals, the selection module using the ratings.

Second professionals may supply bids for the filing of the IP application to an auction module, the selection module using the bids.

A translator on the server may translate at least a portion of the application data into a different language for the at least one second jurisdiction.

The at least one second jurisdiction may comprise a plurality of second jurisdictions.

The document assembler may automatically create the filing documents.

The interface on the priority computer may comprise a webpage provided by the server.

The system according to the present teachings may include, although not limited thereto, a server, a priority computer associated with a priority professional and a priority jurisdiction, and a data store accessible by the server. An interface on the priority computer may receive from the priority professional a specification document and an application information document for an IP application, and send the specification document and application information document to the server. An interface on the server may receive the specification document and application information document from the priority computer, and store the specification document and application information document in the data store. The interface on the priority computer may receive from the priority professional an instruction to initiate filing of the IP application in at least one second jurisdiction, and send the instruction to the server. A document assembler on the server may be adapted to assemble documents for the IP application. A new specification document may be created by the document assembler for each second jurisdiction, each new specification document assembled by combining data from the specification document with a form retrieved from the data store. A new application information document may be created by the document assembler for each second jurisdiction, each new application information document assembled by combining the data from the application information document with a form retrieved from the data store. The interface on the server may send the new specification document and new application information sheet for each second jurisdiction to the associated second computer for review and filing by the associated second professional.

The application information document may be adapted to output the application data in .xml format that can then be imported into the system by the interface on the server.

The application information document may comprise an application data sheet.

Other teachings of the system and method are described in detail below and are also part of the present teachings.

For a better understanding of the present teachings, together with other and further aspects thereof, reference is made to the accompanying drawings and detailed description, and its scope will be pointed out in the appended claims.

BRIEF DESCRIPTION OF THE DRAWINGS

FIG. 4 depicts a data store of the system according to FIG. 1.

DETAILED DESCRIPTION OF THE INVENTION

Figure 1:
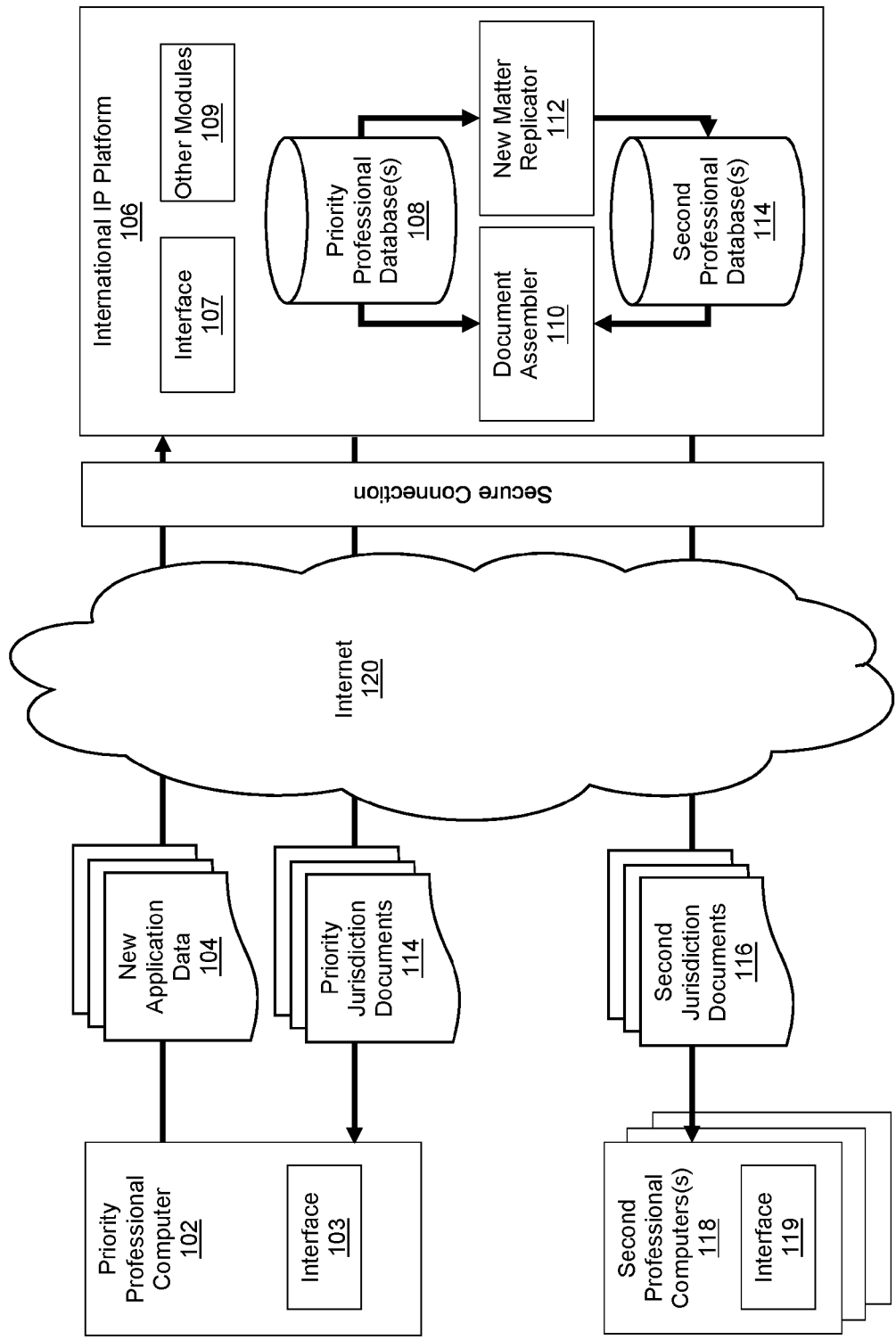
FIG. 1 depicts a system according to the present teachings.

The present teachings are described more fully hereinafter with reference to the accompanying drawings. The following description is presented for illustrative purposes only and the present teachings should not be limited to these embodiments. Any computer configuration and architecture satisfying the speed and interface requirements herein described may be suitable for implementing the system and method of the present embodiments.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect.

For purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/components from other similar features/components and not to impart any order or hierarchy to the features/components.

The present teachings may be facilitated by the priority professional and the second professional using the same system, which may be cloud- or Internet-based. Once the priority professional has prepared the IF application and related papers, and entered the bibliographical and other information into the system, the information may be replicated from the priority professional's portion of a database to a portion of a database associated with the second professional. This may reduce data entry and errors as the priority professional initiates filings in jurisdictions around the world.

The system may have a document assembly module. Documents may be assembled by "merging" document templates (e.g., forms) with data entered into the system. Templates may be used to create any number of documents associated with the filing and prosecution of IP applications, including a patent application (specification, figures, abstract, claims, etc.), information disclosure statement (IDS), oath/declaration, assignment, power of attorney, responses to office actions, etc. Using the document assembler it also helps to assure that documents are being assembled (e.g., created) in accordance with local law. For example, a second professional may create templates that accord with the law in a second jurisdiction. When the priority professional wants to file an IP application in the second jurisdiction, the priority professional (e.g., or staff, etc.) may use the system to create documents for filing in the second jurisdiction by simply hitting a button. The documents may then be available to the second professional for filing in the second jurisdiction.

The system may comprise a translation module. This way, data in the system may be translated to the appropriate language for the second jurisdiction(s).

A system according to the present teachings is scalable in that it permits filings to be made in multiple jurisdictions using the data entered by the priority professional. This reduces administrative work as data can be replicated (and translated) from a portion of the database accessible by the priority professional into portions of the database accessible by second professional(s). In this way, the priority professional may initiate filings in multiple second jurisdictions at once. The system may alert the second professional(s) when a filing has been initiated (e.g., ordered) by the priority professional. Initiation may include providing the IP application and related information to the second professional and/or creating the filing documents for the second jurisdiction. Alerts may include emails, messages, etc., as well as the automatic creation of docketing dates in the system.

A system according to the present teachings may provide improved security. All users (e.g., priority professional, second professional(s), related administrative assistance, etc.) may log into the system using logon credentials (e.g., username, password, etc.). Each professional may only have access to certain matters stored in portions of the database with which they are associated. For example, the second professional may not have access to the priority professional's matters. However, when the priority professional initiates a filing in a second jurisdiction a new matter may be created and made accessible to the second professional and the relevant information copied over to the second professional's portion of the database. Each professional may be able to control how much information is shared with others.

Referring to FIG. 1, shown is a system according to the present teachings. A priority professional may use a computer 102 to establish a secure connection over the Internet 120 and log on to the platform 106. The platform 106 may be offered as a service by a third-party to various professionals 102, 118 (e.g., law firms, etc.). The computers may communicate with each other using various interfaces 103, 107, 119. It is appreciated that a secure connection may be accomplished by any number of means to access the functionality provided by the platform 106. For example, the platform may be provided by secure web pages, using an application, or even as secure remote desktop connection, although not limited thereto.

The platform 106 may include a number of additional modules 109, discussed in more detail below. Such modules may provide additional functionality and may be part of the same software program or different software programs operating on different machines.

The platform 106 may provide functionality for managing IP matters. The priority professional may provide new application data 104 to the platform 106. This may include, for example, information for a new patent or trademark application and for a new matter for storage in one or more databases 108.

One skilled in the art would appreciate that new matter data may include the following information, although not limited thereto: client, client contact address, contact, contact address, matter type (e.g., patent, trademark, etc.), assignee, assignee address, etc.

Required documents for a patent filing, for example, may include an application data sheet (ADS), patent application (specification, claims, abstract, drawings, etc.), and power of attorney. Optional documents for a patent filing may include an inventor oath/declaration, an information disclosure statement (IDS), and an assignment. Documents subsequent to the initial filing may include responses to office actions, extension requests, etc.

Required data for a trademark filing, for example, may include, owner, entity type, address, trademark, an additional statement, goods/services, filing basis, specimen of use, dates of first use, and attorney information. Information subsequent to the initial filing may include responses to office actions, extension requests, etc.

One skilled in the art would appreciate that a single database could be used, with each professional limited to accessing only those portions with its information. The single database may have client information, client-matter information, applications, forms, contacts, and docketing information for users. In the alternative, multiple databases could be used.

Functionality of the platform 106 includes a document assembler 110 that generates documents related to filing IP applications. The document assembler 110 may utilize forms (e.g., templates) that may be stored in a forms database 108, 114 (e.g., portion of database accessible by associated professional). Using data stored in database 108, 114, the document assembler 110 may create (e.g., assemble) documents using the forms.

In operation, the priority professional may provide new application data 104 to the platform 106, which is then stored in its portion of the database 108. The priority professional may then use the platform 106 to generate an IP application 114 (and related documents) for filing in the priority jurisdiction.

It is typical in the filing of IP applications to file in one or more second jurisdictions after filing an application in a priority application. This allows an applicant to obtain rights around the world while claiming the benefit of the priority date of the priority application.

When the priority professional is ready to initiate filings in subsequent (second) jurisdictions, the priority professional can do so using the platform 106. Because the priority professional has already supplied data for the new matter 104 (e.g., trademark application, patent application, etc.) to the platform 106, a new matter replicator 112 may copy that data from its portion of the database 108 to a portion of the database 114 accessible by one or more second professionals.

Once the data for the new matter (e.g., priority application information 214, new international matter 216, etc.) has been copied to a portion of a database 114 accessible by the second professional (e.g., in response to priority professional actions, etc.), the document assembler 110 may create documents 116 related to filing the IP application in the second jurisdiction. For example, the second professional may have forms (e.g., templates) specific to his or her jurisdiction stored in the database 114. These forms may be used to create an application specification (e.g., patent, trademark details, etc.), application cover sheet (e.g., bibliographic information, etc.), etc. The document assembler 110 may include a formatter that properly formats the documents for each jurisdiction (e.g., margin width, paper size, etc.).

The copying of data to the second professional(s) database 114 and/or the creation of documents for the second jurisdiction 116 may be performed automatically (e.g., priority professional may identify second jurisdiction(s) at initial setup) or upon action by the priority professional. For example, subsequent to filing the priority application in the priority jurisdiction, the priority professional may click a button to copy data and/or create second jurisdiction documents for each of a number of jurisdictions. The second jurisdiction(s) may be alerted to the fact that they have a new IP application (e.g., new filing order) by message, email, new docket entries, etc.

Figure 2:
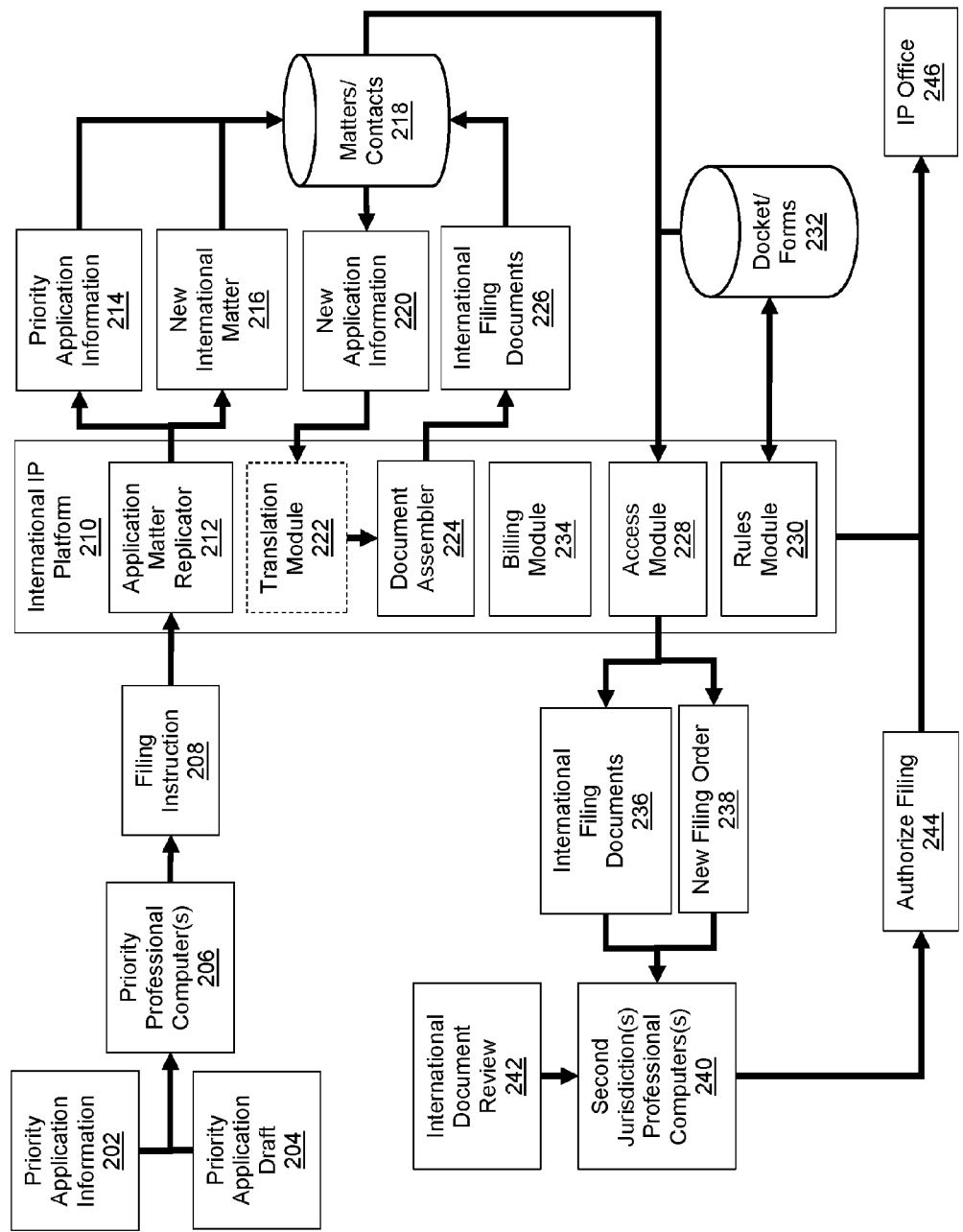
FIG. 2 depicts data flow of the system according to FIG. 1.

Referring now to FIG. 2, shown is data flow of the system according to FIG. 1. As shown, priority application information 202 (e.g., bibliographical data, application data, and may include data file) and a draft application 204 may be sent by the priority professional computer 206 with a filing instruction 208 to the platform 210. When the priority professional wishes to initiate filing in additional (second) jurisdictions, the priority professional may activate the application matter replicator 212. The application matter replicator 212 may copy the information for the new IP application from a portion of a database accessible by the priority professional to portion(s) of a database 218 accessible by the second professional(s). At this time, docket entries may also be created in the portion of a database 232 accessible by the second professional(s). Docket entries may help assure that the filings in the second jurisdiction(s) is/are completed in a timely fashion.

If necessary, the new application information 220 may be sent to a translation module 222 and translated into an appropriate language for the second jurisdiction(s). A document assembler 224 may then create an IP application and related documents 226 for the second jurisdiction(s). Those documents 226 can be stored in a portion of the database 218 accessible by the second professional(s). The priority professional may review and approve the filing documents created for the second jurisdiction(s). Once approved, the second professional(s) may then simply file the documents with the appropriate government office.

The second professional(s) can access the platform 210 using an access module 228. For example, a secure connection may be used. The platform 210 may include a server with virtual remote desktops. Using a remote desktop connection (e.g., terminal server, etc.) the professionals may connect to the platform 210 in order to take control of a virtual desktop. In this way, input from the client system is transmitted to the server, where software execution takes place. The professionals may also connect to the platform 210 using a locally-installed application or through a web interface, although not limited thereto.

The second professional(s) may download the IP application and related documents 236 along with a new filing order 238. The new filing order 238 may be an "order letter" from the priority professional authorizing the second professional(s) to initiate work. It may also be an alert, alerting the second professional(s) to the new information. The second professional(s) may review 242 the documents using the second professional computer(s) 240 to assure they are adequate for filing in the second jurisdiction(s). The second professional(s) may edit the documents as necessary. Once ready for filing, the second professional(s) may authorize the filing 244 in the second jurisdiction(s) with the relevant IP office(s) 246.

The platform 210 may also comprise a billing module 234 for managing billing of matters between the second professional(s) and priority professional.

The platform 210 may also comprise a rules module 230 for assisting in the creating of docket entries in the database 232.

Once the application information is copied from a portion of the database accessible by the priority professional to a portion of a database accessible by a second professional (e.g., may be same database), the system may automatically send a new matter number to the priority professional. This way, the priority professional can correspond with the second professional using the appropriate matter number. Professionals typically reference each other's matter numbers (e.g., docket number, attorney number, reference number, etc.) when corresponding with each other so that they can be assured they are discussing the same matter. However, professionals have different numbering systems and may have different numbers for the same matter. The matter number may be created automatically when the new information is copied. The matter number may also be created manually by the second professional and assigned to the new matter information. In either case, the matter number can be returned to the priority professional upon creation and serve as an acknowledgement that the filing order has been received by the second professional.

The bibliographical and application information (and associated data files, etc.) may only be copied from the priority professional to the second professional at the time the filing documents are prepared (e.g., assembled) for the second jurisdiction. As used herein, bibliographic data may include inventor, assignee, and applicant data, although not limited thereto. The copy may be temporary such that there is only one persistent copy on the database. But the replication may exist temporarily in RAM so document assembly can be performed and the filing documents otherwise assembled. In the alternative, the copy may be implemented by making a persistent copy of the bibliographic information either at the time the new matter is created or at the time the filing documents are created. In another alternative, no copying may be performed but instead the professionals may use the same data.

The system may provide an "on-demand" interface for initiating filings in multiple jurisdictions. For example, the priority professional may access a website and upload the information/documents for filing in one or more second jurisdictions. The priority professional may select one or more second jurisdiction for filing and/or specific second professionals, agree to pay filing fee(s) set by the second professionals and/or relevant IP offices, and submit the documents. At this point, the system may copy the information to the selected second professional(s) for filing. The information and/or generated documents could be retained until the second professional(s) access it, or it could be sent to the second professional(s) (e.g., by email). It is to be appreciated that the interface could be by website or a software application stored on the professionals' computer (s).

The systems and methods according to the present teachings permit the creation of an affiliate program. One or more professionals from each jurisdiction may connect to the system and set up their fees (e.g., filing fees) they will charge each other. It is to be appreciated that each professional may offer discounted fees to other professionals using the system, since data only needs to be entered once by the priority professional, reducing the administrative work for the second professionals. The system may limit each jurisdiction to a single professional, allowing the professionals to exchange filings with each other.

The present teachings provide many benefits and leverage cloud computing infrastructure, including using terminal server to connect the filing platform. This provides a high level of security, data backup, and platform availability. Such a system may be useful for professionals that do not necessarily have reciprocal work they can send to other jurisdictions; however, they can offer attractive discounts because of the reduced administrative workload. Using a cloud-based platform service adds revenue without significant additional labor or space costs.

Figure 3:
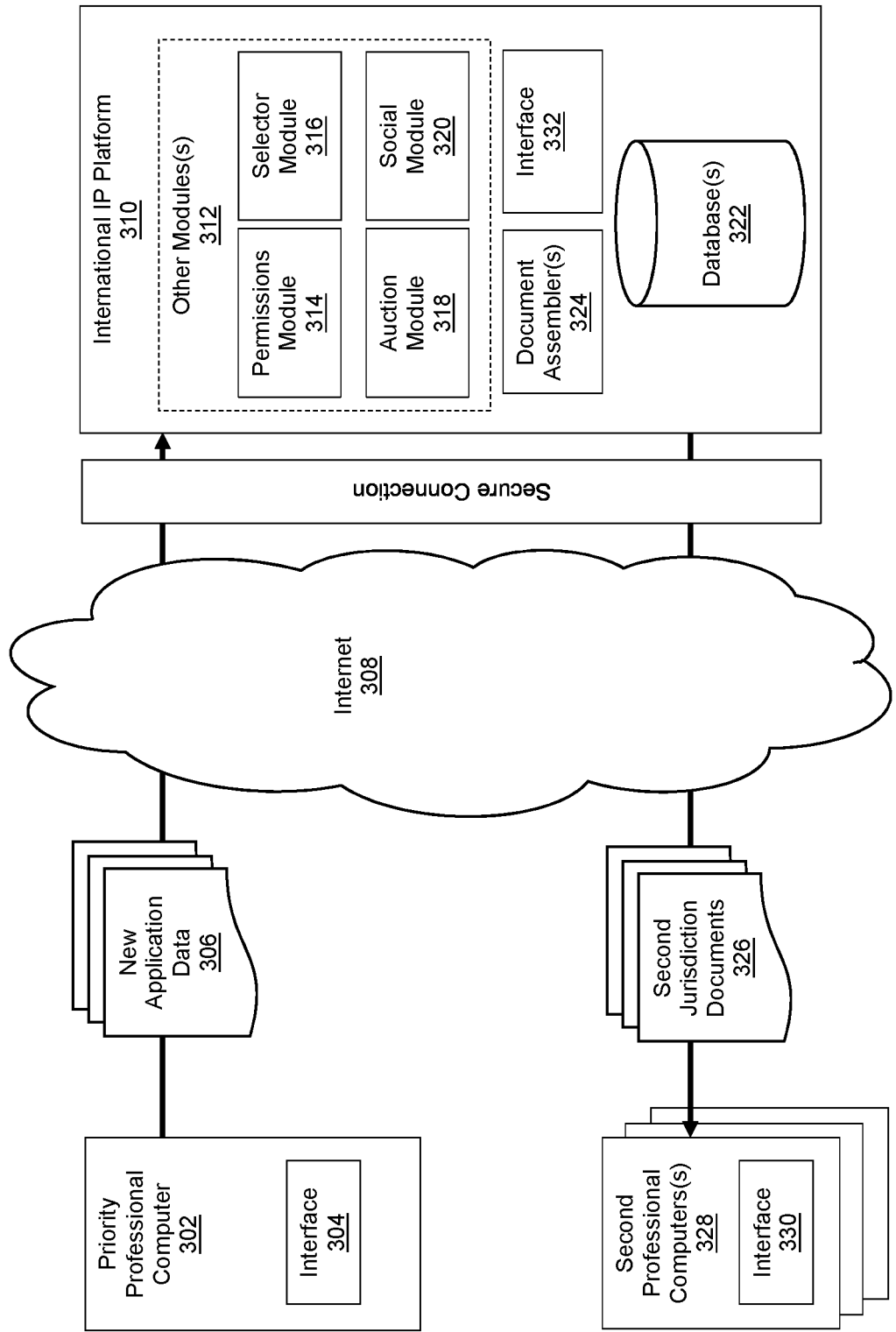
FIG. 3 depicts another view of the system according to FIG. 1.

Referring now to FIG. 3, shown is another view of the system according to FIG. 1. As shown, a priority professional computer 302 (e.g., associated with a priority professional) may have an interface 304 used to provide new application data 306 (e.g., for an IP application) to the server(s) 310 over the Internet 308. The new application data 306 may be stored in one or more databases 322 (e.g., data store).

The interface 332 on the server 310 may have a formatter so that it can process application data 306 provided by the priority professional. For example, the priority professional may provide at least some of the data 306 in a form that outputs .xml (e.g., ADS form). In an alternative, the data 306 may be supplied to the server 310 in .xml format (or some other format). The interface 332 may interpret the data and import it into the system for storage in the database(s) 322.

The server(s)/platform 310 may have a number of modules 312 to provide functionality. These modules 312 (and all other modules/functionality described herein) may be provided in a single or separate software applications, and may run on a single or multiple servers. One skilled in the art appreciates the different ways functionality may be provided in accordance with the present teachings, which are not limited to any particular embodiment disclosed.

The priority professional may provide an instruction to file the IP application in one or more second jurisdictions. A selector module 316 may select a second professional (typically just one) in each of the one or more second jurisdictions. The priority professional may have preferences (e.g., a preferred second professional in a particular second jurisdiction), which may be used by the selector 316.

A social module 320 may allow professionals using the system to rate (e.g., like, etc.) other professionals. Based on these ratings, the selector 316 may select appropriate second professionals. For example, the selector 316 may select the highest rated second professional in each second jurisdiction, considering the ratings of all users on the system, just the priority professional's ratings, or a combination of ratings from a subset of all users on the system.

An auction module 318 may manage bids of professionals to complete the filing of the IP application in their respective jurisdictions. For example, professionals may indicate that filing the IP Application will cost X dollars. Using this information, the selector 316 may select a second professional in each second jurisdiction. For example, it may select the second professional that had the lowest bid in each jurisdiction, although not limited thereto. The selector 316 may also weight different factors (ratings, bid, etc.) in order to select appropriate second professionals.

One the selector 316 has selected the appropriate second professionals, a permissions module 314 may change the permissions for the application data stored in database(s) 322. For example, it may make the application data accessible to each of the selected second professionals. This way, it may not be necessary for the system to make copies of the data. Instead, the priority professional may upload the application data for storage in the database(s) 322 and once the selector 316 has identified second professionals the data will be made available to those second professionals (e.g., may be read only permission, ability to download, edit permission, or a combination).

A document assembler 324 may then use the application data to create second jurisdiction documents 326 that it sends to interface(s) 330 on second professional computer(s) 328. This way, the priority professional may simultaneously initiate filings in multiple second jurisdictions using the system.

Referring now to FIG. 4, shown is a data store of the system according to FIG. 1. As described above, one or more data stores 400 may have portions that are only accessible to certain professionals. For example, the priority professional may have a portion 402 and each second professional may have a portion 404. The data store 400 may have databases (e.g., can be tables or some other storage format) with information on matters 406, appointments 408, permissions 410, forms 412, and documents 414 (e.g., filing documents created by system using forms), although not limited thereto.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A system for automating the preparation of intellectual property applications for filing, comprising:
   a server;
   a priority computer associated with a priority professional and a priority jurisdiction;
   a first secure connection over the Internet between the server and the priority computer, the first secure connection requiring authentication of the priority professional;
   a plurality of second computers, each associated with one of a plurality of second professionals and one of a plurality of second jurisdictions;
   a plurality of second secure connections over the Internet, one between each second computer and the server, each second secure connection requiring authentication of the associated second professional;
   a data store accessible by the server;
   the data store having a matter database, each matter having a matter number;
   the data store having a forms database, each form relating to an intellectual property filing document;
   the data store having an appointment database, each appointment relating to a filing deadline;
   the priority professional associated with a first portion of the data store, and each second professional associated with a second portion of the data store;
   each of the first and second portions of the data store only accessible by the associated professional after authentication and not accessible by any of the other professionals;
   an interface on the priority computer receiving from the priority professional application data for an IP application, and sending the application data to the server over the first secure connection;
   an interface on the server receiving the application data from the priority computer, and storing the application data in the first portion of the data store;
   the interface on the priority computer receiving from the priority professional an instruction to initiate filing of the IP application in each second jurisdiction, and sending the instruction to the server over the first secure connection;
   a replicator on the server adapted to copy the application data from the first portion of the data store to each second portion of the data store;
   a new matter record created by the replicator and stored in each second portion of the data store, the replicator creating each new record by copying matter information from a priority matter stored in the first portion of the data store, the priority matter having matter information for the IP application;
   a new appointment record created by the replicator and stored in each second portion of the data store, each new appointment record relating to the filing deadline for the IP application in the associated second jurisdiction;
   a document assembler on the server adapted to assemble documents for the IP application;
   a specification document created by the document assembler for each second jurisdiction, the specification document for each second jurisdiction assembled by combining the application data with a form retrieved from the second portion of the data store associated with the respective second professional;
   an application information sheet created by the document assembler for each second jurisdiction, the application information sheet for each second jurisdiction assembled by combining the application data with a form retrieved from the second portion of the data store associated with the respective second professional;
   the interface on the server sending the specification document and application information sheet for each second jurisdiction to the associated second computer over its second secure connection for review and filing by the associated second professional.

2. The system of claim 1 further comprising a translator on the server translating at least a portion of the application data into a different language for each second jurisdiction.

3. The system of claim 1 wherein the system limits each second jurisdiction to a single second professional.

4. The system of claim 1 wherein the application data copied by the replicator has a temporary state that only lasts until the specification and application information sheet are assembled.

5. The system of claim 1 wherein the replicator only copies the application data at the time the filing documents are assembled.

6. The system of claim 1 wherein the specification document comprises a specification for a new patent application and the application information sheet comprises an application data sheet.

7. The system of claim 1 wherein the specification document comprises a new trademark application and the application information sheet comprises a cover sheet for the new trademark application.

8. The system of claim 1 further comprising a billing module on the server;
the billing module automatically creating an invoice for each second professional to file the IP application, and transmitting each invoice to the priority professional.

9. The system of claim 1 wherein the server transmits filing documents for each second jurisdiction to an official government office for filing in the respective second jurisdiction.

10. The system of claim 1 wherein each new matter record is associated with a matter number for the priority matter.

11. The system of claim 1 wherein the server comprises a plurality of computers communicating with each other over a network.

12. A system for automating the preparation of intellectual property applications for filing, comprising:
a server;
a priority computer associated with a priority professional and a priority jurisdiction;
a first secure connection over the Internet between the server and the priority computer, the first secure connection requiring authentication of the priority professional;
at least one second computer, each associated with one of at least one second professional and one of
at least one second jurisdiction;
at least one second secure connection over the Internet between the server and each at least one second computer, each second secure connection requiring authentication of the associated second professional;
a data store accessible by the server;
the priority professional associated with a first portion of the data store, and each second professional associated with a second portion of the data store;
each of the first and second portions of the data store only accessible by the associated professional after authentication and not accessible by any of the other professionals;
an interface on the priority computer receiving from the priority professional application data for an IP application, and sending the application data to the server over the first secure connection;
an interface on the server receiving the application data from the priority computer, and storing the application data in the first portion of the data store;
the interface on the priority computer receiving from the priority professional an instruction to initiate filing of the IP application in each second jurisdiction, and sending the instruction to the server over the first secure connection;
a document assembler on the server assembling filing documents for each second jurisdiction, the filing documents for each second jurisdiction assembled by combining the application data with at least one form retrieved from the associated second portion of the data store;
the interface on the server sending the filing documents for each second jurisdiction to the associated second computer over its second secure connection for review and filing by the associated second professional.

13. The system of claim 12 wherein the data store comprises a plurality of matter records, each matter record having a matter number, bibliographic information, and priority data;
a priority matter record of the plurality of matter records stored in the first portion of the data store, the priority matter record having matter information for the IP application;
a replicator on the server creating a new matter record in each second portion of the data store, the replicator creating each new record by copying the matter information from the priority matter record.

14. The system of claim 12 wherein the filing documents comprise at least two of: a specification, a drawing, an information disclosure statement, a power of attorney, a declaration, and an assignment.

15. The system of claim 12 wherein the data store comprises a plurality of appointment records;
a new appointment record is created in each second portion of the data store, each new appointment record relating to the filing deadline for the IP application in the associated second jurisdiction.

16. The system of claim 12 wherein there is only a single persistent copy of the application data on the server regardless of the number of second jurisdictions.

17. The system of claim 12 wherein the document assembler automatically creates the filing documents, the interface on the server providing the filing documents to the priority professional for review and approval before sending to the second computers.

18. The system of claim 12 wherein the interface on the priority computer comprises a webpage provided by the server.

19. A system for automating the preparation of intellectual property applications for filing, comprising:
a server;
a priority computer associated with a priority professional and a priority jurisdiction;
a first secure connection over the Internet between the server and the priority computer, the first secure connection requiring authentication of the priority professional;
at least one second computer, each associated with one of at least one second professional and one of
at least one second jurisdiction;
a data store accessible by the server;
an interface on the priority computer receiving from the priority professional application data for an IP application, and sending the application data to the server over the first secure connection;
an interface on the server receiving the application data from the priority computer, and storing the application data in the data store;
the interface on the priority computer receiving from the priority professional an instruction to initiate filing of the IP application in each second jurisdiction, and sending the instruction to the server over the first secure connection;

a document assembler on the server assembling filing documents for each second jurisdiction, the filing documents for each second jurisdiction assembled by combining the application data with at least one form retrieved from the data store;

the interface on the server sending the filing documents for each second jurisdiction to the associated second computer for review and filing by the associated second professional.

20. The system of claim 19 wherein the at least one second professional comprises a plurality of second professionals, the document assembler automatically creates the filing documents, and a translator on the server translates at least a portion of the application data into a different language for each second jurisdiction.

21. A system for automating the preparation of intellectual property applications for filing, comprising:

a server;

a priority computer associated with a priority professional and a priority jurisdiction;

a first secure connection over the Internet between the server and the priority computer, the first secure connection requiring authentication of the priority professional;

a data store accessible by the server;

an interface on the priority computer receiving from the priority professional application data for an IP application, and sending the application data to the server over the first secure connection;

an interface on the server receiving the application data from the priority computer, and storing the application data in the data store;

the interface on the priority computer receiving from the priority professional an instruction to initiate filing of the IP application in at least one second jurisdiction, and sending the instruction to the server over the first secure connection;

a selector module on the server selecting at least one second professional, each at least one second professional associated with one of the at least one second jurisdiction;

a permissions module on the server changing the permissions for the application data stored in the data store to allow access by the at least one second professional;

a document assembler on the server assembling filing documents for the at least one second jurisdiction, the filing documents assembled by combining the application data with at least one form retrieved from the data store;

the interface on the server sending the filing documents for the at least one second jurisdiction to each associated second computer for review and filing by the associated second professional.

22. The system of claim 21 wherein the selection module uses preferences of the priority professional stored in the data store, the preferences including the identification of at least one preferred second professional for a particular second jurisdiction.

23. The system of claim 21 further comprising a social module on the server maintaining ratings of second professionals, the selection module using the ratings.

24. The system of claim 21 further comprising an auction module, wherein second professionals supply bids for the filing of the IP application to the auction module, the selection module using the bids.

25. The system of claim 21 further comprising a translator on the server translating at least a portion of the application data into a different language for the at least one second jurisdiction.

26. The system of claim 21 wherein the at least one second jurisdiction comprises a plurality of second jurisdictions.

27. The system of claim 21 wherein the document assembler automatically creates the filing documents.

28. The system of claim 21 wherein the interface on the priority computer comprises a webpage provided by the server.

29. A system for automating the preparation of intellectual property applications for filing, comprising:

a server;

a priority computer associated with a priority professional and a priority jurisdiction;

a data store accessible by the server;

an interface on the priority computer receiving from the priority professional a specification document and an application information document for an IP application, and sending the specification document and application information document to the server;

an interface on the server receiving the specification document and application information document from the priority computer, and storing the specification document and application information document in the data store;

the interface on the priority computer receiving from the priority professional an instruction to initiate filing of the IP application in at least one second jurisdiction, and sending the instruction to the server;

a document assembler on the server adapted to assemble documents for the IP application;

a new specification document created by the document assembler for each second jurisdiction, each new specification document assembled by combining data from the specification document with a form retrieved from the data store;

a new application information document created by the document assembler for each second jurisdiction, each new application information document assembled by combining the data from the application information document with a form retrieved from the data store;

the interface on the server sending the new specification document and new application information sheet for each second jurisdiction to the associated second computer for review and filing by the associated second professional.

30. The system of claim 29 wherein the application information document is adapted to output the application data in .xml format that is then imported into the system by the interface on the server.

31. The system of claim 29 wherein the application information document comprises an application data sheet.

* * * * *

UNITED STATES PATENT AND TRADEMARK OFFICE
CERTIFICATE OF CORRECTION

PATENT NO.        : 10,387,978 B2
APPLICATION NO.   : 15/223692
DATED             : August 20, 2019
INVENTOR(S)       : Wesley W. Whitmyer, Jr.

Page 1 of 1

It is certified that error appears in the above-identified patent and that said Letters Patent is hereby corrected as shown below:

On the Title Page

ITEM [74], delete:
"Whitmeyer IP Group LLC"

And insert:
--Whitmyer IP Group LLC--

Signed and Sealed this
Nineteenth Day of November, 2019

Andrei Iancu
*Director of the United States Patent and Trademark Office*